(12) United States Patent
Clarke et al.

(10) Patent No.: US 10,086,269 B2
(45) Date of Patent: Oct. 2, 2018

(54) GAMES CONTROLLER

(71) Applicant: INTERNATIONAL BUSINESS MACHINES CORPORATION, Armonk, NY (US)

(72) Inventors: Matthew J. Clarke, Newbury (GB); Adam Coulthard, Southampton (GB); Mark J. Lawrence, Eastleigh (GB); Heather Pollard, Luton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 14/948,103

(22) Filed: Nov. 20, 2015

(65) Prior Publication Data

US 2017/0144061 A1    May 25, 2017

(51) Int. Cl.
*A63F 13/214* (2014.01)
*G06F 1/32* (2006.01)
*A63F 13/235* (2014.01)

(52) U.S. Cl.
CPC .......... *A63F 13/214* (2014.09); *A63F 13/235* (2014.09); *G06F 1/3231* (2013.01)

(58) Field of Classification Search
None
See application file for complete search history.

(56) References Cited

U.S. PATENT DOCUMENTS

| 5,477,952 A * | 12/1995 | Castellano | G07F 5/18 194/200 |
| 6,878,066 B2 | 4/2005 | Leifer et al. | |
| 6,948,083 B2 | 9/2005 | Eguchi et al. | |
| 7,670,224 B2 | 3/2010 | Williams | |
| 2004/0019292 A1 * | 1/2004 | Drinan | A61B 5/053 600/547 |
| 2004/0023720 A1 * | 2/2004 | Sakoh | A63F 13/06 463/37 |

(Continued)

FOREIGN PATENT DOCUMENTS

CN    101332364 A    12/2008
JP    3907609 B2    4/2007

OTHER PUBLICATIONS

Hruska, "PS4, Xbox One power consumption analysis points to Sony advantage and future efficiency gains", Dec. 13, 2013, 4 pages, http://www.extremetech.com/gaming/173127-ps4-xbox-one-power-consumption-analysis-points-to-sony-advantage-and-future-efficiency-gains.

*Primary Examiner* — Robert T Clarke, Jr.
(74) *Attorney, Agent, or Firm* — Griffiths & Seaton PLLC

(57) ABSTRACT

A wireless controller for a video game playing device includes electrically conductive contacts on portions of the surface of the controller positioned so that a first contact is contactable by one hand of the user and a second contact is contactable by the other hand of the user during operation of the controller. Electrical circuitry applies a voltage between the first contact and the second contact so that when the one hand contacts the first contact and the other hand contacts the second contact an electrical current flows through the user's body completing an electrical circuit. Further electrical circuitry enables power supply to the controller electronic control circuitry responsive to completion of the electrical circuit, and disables electrical power supply to the controller electronic control circuitry responsive to breaking of the electrical circuit.

10 Claims, 6 Drawing Sheets

(56) References Cited

U.S. PATENT DOCUMENTS

2009/0005165 A1\* 1/2009 Arezina .............. G07F 17/3244
 463/37
2009/0295714 A1\* 12/2009 Erickson ............... G06F 1/3203
 345/156
2010/0066734 A1\* 3/2010 Ohta ....................... G06T 15/30
 345/419

\* cited by examiner

GAMES CONTROLLER

BACKGROUND

A video game console is a video game playing device comprising a processor which runs software for operating video games. The game playing environment is displayed on a suitable connected display device and a game player interacts with the game using an input device linked to the console. Typically the input device comprises a video game console controller which is held by the player, usually with both hands. The player interacts with the game using controls usually comprising input mechanisms on the controller, typically buttons, joysticks or the like which are pressed or moved by the player with thumbs or fingers.

The first such controllers were linked by wired connection to video game consoles for communicating input signals from the input mechanisms. More recent controllers are usually wirelessly connected to their respective console. This requires the controller to be powered by a contained electrical power pack, typically comprising disposable or rechargeable batteries.

Controllers of this type typically consume power all the time when switched on. Such power drain may lead to depletion of controller battery capacity to an extent that the controller is unusable when a player wishes to resume playing an interrupted game. It is known to provide a power-off mechanism in a controller which automatically switches off the controller after a fixed time delay from the last-detected player input.

SUMMARY

In accordance with the present invention there is now provided a wireless controller for a video game playing device. The controller includes: input controls for operating by a user for entering video game playing commands; controller electronic control circuitry for communicating entered video game playing commands to a video game playing device by wireless link; and controller electrical power supply for providing electrical power to the controller circuitry. The controller includes electrically conductive contacts on portions of the surface of the controller positioned so that a first contact is contactable by one hand of the user and a second contact is contactable by the other hand of the user during operation of the controller. First electrical circuitry applies a voltage between the first contact and the second contact so that when the one hand contacts the first contact and the other hand contacts the second contact an electrical current can flow through the user's body as an electrical circuit is completed. Second electrical circuitry, responsive to completion of the electrical circuit, enables power supply to the controller electronic control circuitry, and, responsive to breaking of the electrical circuit, disables electrical power supply to the controller electronic control circuitry.

In accordance with a second aspect of the invention, there is provided a method of operating a wireless controller for a video game playing device. The controller includes: input controls for operating by a user for entering video game playing commands; controller electronic control circuitry for communicating entered video game playing commands to a video game playing device by wireless link; and controller electrical power supply for providing electrical power to the controller circuitry. The method includes providing electrically conductive contacts on portions of the surface of the controller positioned so that a first contact is contactable by one hand of the user and a second contact is contactable by the other hand of the user during operation of the controller. The method also includes applying a voltage between the first contact and the second contact so that when the one hand contacts the first contact and the other hand contacts the second contact an electrical current can flow through the user's body as an electrical circuit is completed. The method further includes, responsive to completion of the electrical circuit, enabling power supply to the controller electronic control circuitry, and responsive to breaking of the electrical circuit, disabling electrical power supply to the controller electronic control circuitry.

In embodiments of the invention an electrically conductive contact is a pad with an electrically conductive surface. The electrically conductive surface may be an electrically conductive plastic. Embodiments may include an electrical energy storage mechanism for supplying electrical power to the controller electronic control circuitry to prevent disabling of electrical power supply to the controller electronic control circuitry during a momentary breaking of the electrical circuit. Embodiments may include electronic control circuitry for, responsive to breaking of the electrical circuit and before disabling electrical power supply to the controller electronic control circuitry, wirelessly communicating a pause command to the video game playing device so as to pause a currently active video game. Further electronic control circuitry may be provided for, responsive to recreation of the electrical circuit after a period of breaking of the circuit, wirelessly communicating a resume command to the video game playing device so as to resume a currently paused video game. Embodiments may include methods for operating controllers including these embodiments.

BRIEF DESCRIPTION OF THE DRAWINGS

Embodiments of the present invention will now be described, by way of example only, with reference to the following drawings in which.

DETAILED DESCRIPTION

Embodiments of the invention provide a mechanism for disabling power supply to the electronic control circuitry of a wireless controller of a video game playing device when a user ceases to hold the controller with both hands. The video game playing device is typically a video game playing console which displays a game environment on a suitable display. It will be apparent that the video game playing device may comprise any other device which may be controlled from a wireless controller, for example a personal computer or a smart television.

Figure 1A:
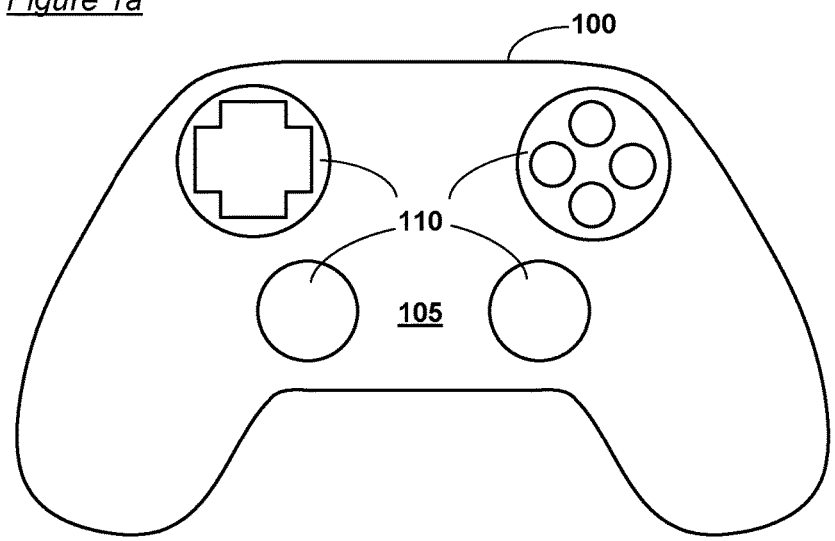
FIG. 1*a* illustrates the upper surface of a known wireless video games controller.

FIG. 1a illustrates a top view of a wireless controller of a known configuration. Controller 100 comprises a suitable shape and size for convenient holding by both hands of a user. Controller 100 comprises input controls, for example comprising input mechanisms of various types positioned on the surface of controller 100, illustrated by input mechanisms 110 on the top surface 105 of controller 100.

Figure 1B:
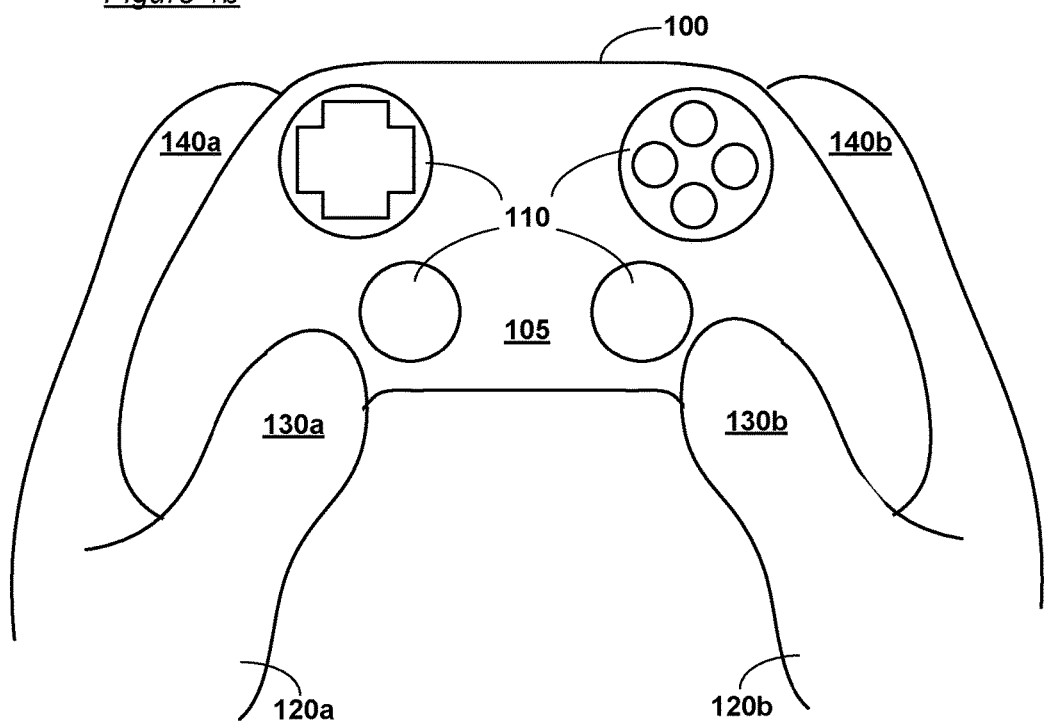
FIG. 1*b* illustrates the upper surface of the known controller of FIG. 1*a* in use.

FIG. 1b illustrates a top view of controller 100 in operation. A user holds controller 100 by left hand 120a and right hand 120b. Controller 100 comprises user input controls comprising input mechanisms 110. Input mechanisms 110 comprise for example buttons and joysticks positioned for convenient operation by the user's digits, particularly thumbs 130a and 130b. Controller 100 may comprise other input mechanisms (not shown) positioned on the front of controller 100 (the upper edge of the controller as pictured) for operation by index fingers 140a and 140b.

Figure 1C:
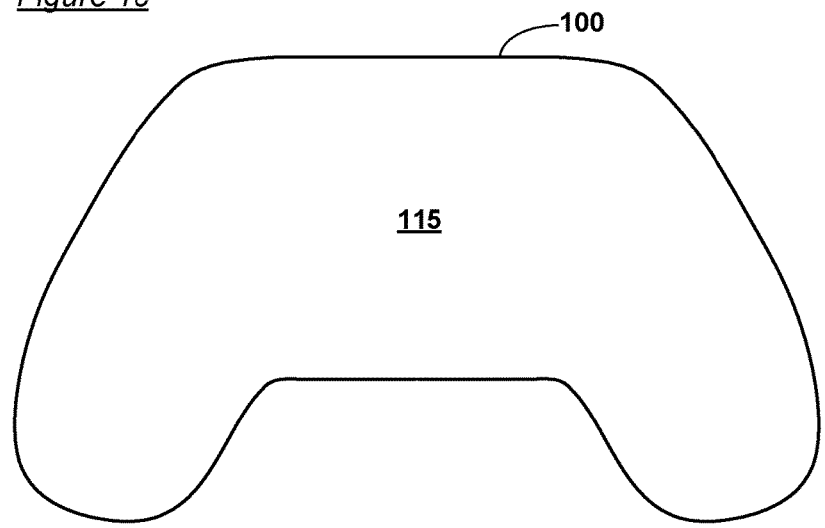
FIG. 1*c* illustrates the lower surface of the known wireless video games controller.
Figure 1D:
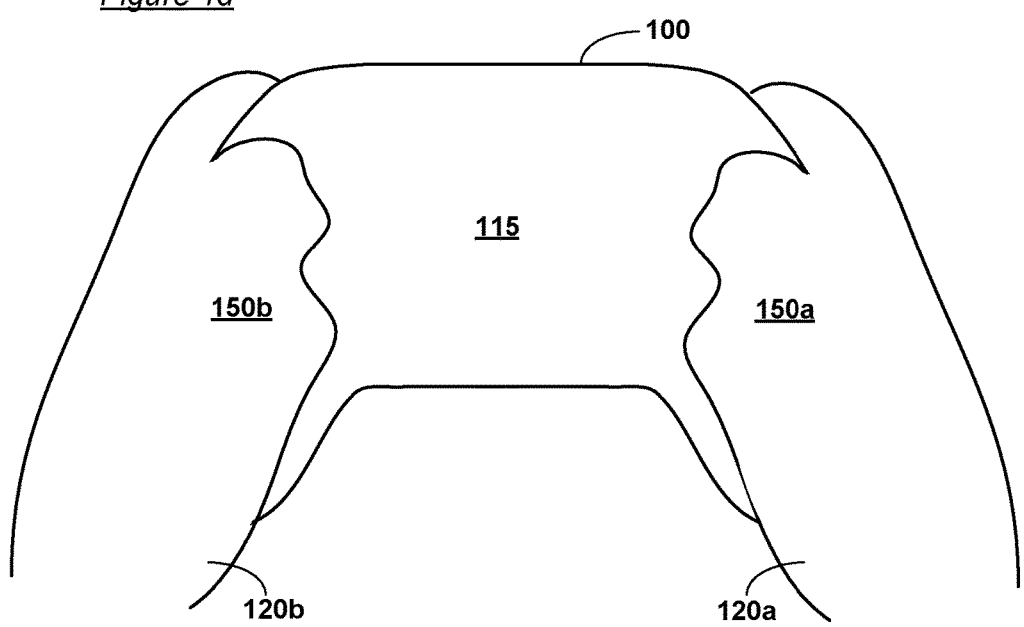
FIG. 1*d* illustrates the lower surface of the known controller of FIG. 1*c* in use.

FIG. 1c illustrates the underside 115 of controller 100. Underside 115 typically does not comprise input mechanisms, although they may be provided. FIG. 1d illustrates the underside 115 of controller 100 in operation. A user grasps it by hands 120a and 120b. Typically third to fifth fingers 150a and 150b grasp the underside 115 of controller 100.

Figure 2A:
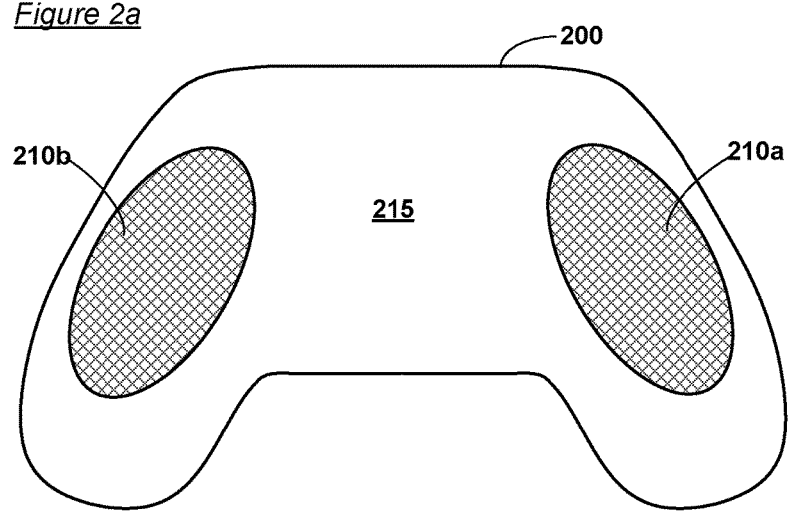
FIG. 2*a* illustrates the lower surface of a wireless video games controller according to an embodiment of the present invention.

FIG. 2a illustrates underside 215 of wireless controller 200 according to an embodiment of the present invention. Underside 215 of controller 200 comprises electrically conductive contacts comprising conductive pads 210a, 210b. In an embodiment, underside 215 of controller 200 comprises left conductive pad 210a and right conductive pad 210b. Conductive pads 210a, 210b comprise an electrically conductive material suitable for conducting electricity to a user contacting conductive pads 210a, 210b.

In an embodiment pads 210a, 210b comprise an electrically conductive metal or metal alloy. In another embodiment pads 210a, 210b comprise an electrically conductive plastic material, or in other embodiments a laminated material comprising an electrically conductive touch surface layer.

Figure 2B:
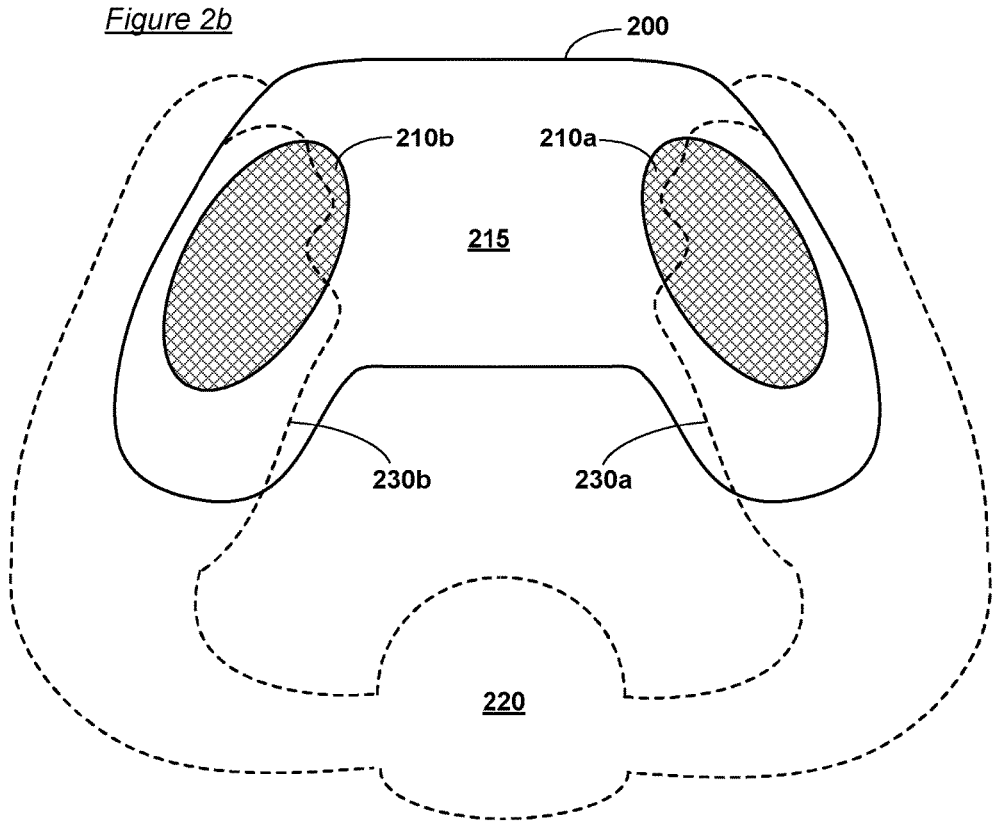
FIG. 2*b* illustrates the lower surface of the controller of FIG. 2*a* in use.

FIG. 2b illustrates the embodiment of FIG. 2a in use. FIG. 2b illustrates a view from below showing user 220 diagrammatically as the dashed outline. User 220 comprises left hand 230a and right hand 230b. The embodiment comprises electrically conductive pads 210a, 210b suitably sized and positioned on controller 200 so that when user 220 grasps controller 200 with both hands, left hand 230a contacts left conductive pad 210a and right hand 230b contacts right conductive pad 210b. In an embodiment, conductive pads 210a, 210b are positioned so as to contact portions of hands 230a, 230b respectively which the user 220 does not use for operating input mechanisms of controller 200, but only for grasping controller 200. In an embodiment, this comprises one or more of the third to fifth fingers of left hand 230a and right hand 230b.

The human body, for example user 220, can conduct electricity when a voltage is applied across two points of the body because the body comprises fluids comprising mostly water and also comprising electrolytes. Therefore, if a voltage is applied between electrically conductive pads 210a and 210b a current can flow through the body of user 220 when the user grasps left pad 210a with left hand 230a and right pad 210b with right hand 230b.

The total resistance of the human body to electrical current depends on the distance within the body over which the current passes between the two conductive pads. This is one component of the total resistance. Another component of the total resistance is the resistance provided at the skin barrier at each skin contact point, with pads 210a, 210b respectively. This varies a lot depending on the degree of wetness of the skin and the degree of force used to grip the conductive pads. Resistance reduces a lot when the skin is moist, for example when the user is sweating. The total resistance of the body may vary between about 1,000 ohms and 100,000 ohms. It will be appreciated that this range is very approximate, and depends upon a number of factors each of which may include a large element of variability. Different individual users may have markedly different inherent electrical resistance, for example.

Embodiments of the invention provide a mechanism for passing an electrical current through the body of a user of a controller as they grasp the controller for video game control. Circuitry in the controller has the effect that, responsive to the passage of current through the user's body, the controller video game electronic control circuitry remains active, potentially communicating by wireless connection to a video games playing device such as a video games console, and consuming battery power. If passage of electrical current through the user's body ceases, power to video controller game electronic control circuitry ceases, and the controller ceases to consume battery power.

Figure 3A:
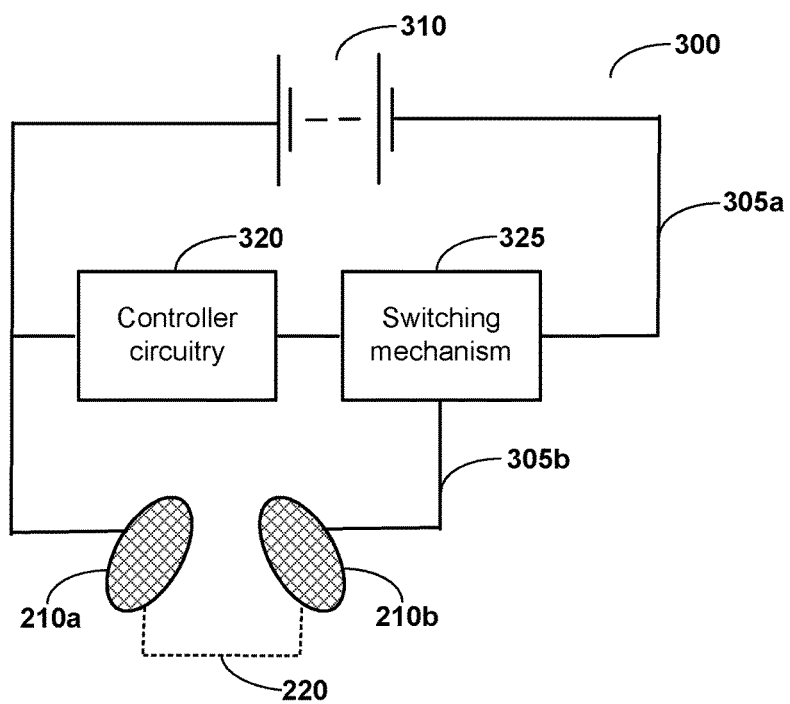
FIG. 3*a* illustrates a circuit diagram of an embodiment of the present invention.

FIG. 3a illustrates a simplified circuit diagram of an embodiment of the present invention. The circuit 300 of FIG. 3a comprises circuit portion 305a providing power to controller electronic control circuitry 320 of controller 200. Controller power pack 310 may comprise, for example, a rechargeable battery. Switching device 325 comprises a switch which, when closed to complete circuit portion 305a, allows electrical current to flow through controller electronic control circuitry 320 so as to allow controller 200 to wirelessly communicate with a video game playing device to control a game executing thereon. Electrical current flowing through circuit portion 305b of circuit 300 controls the action of switching device 325.

Circuit portion 305b comprises electrically conductive contacts comprising electrically conductive pads 210a, 210b. When the user grasps controller 200 with left and right hands contacting respectively pads 210a and 210b, a small electrical current can flow through user body portion 220 as circuit portion 305b is completed. Switching mechanism 325 reacts to current flowing through circuit portion 305b, indicative of the user operating controller 200 and, and completes circuit portion 305a so as to power controller electronic control circuitry 320. When the user removes contact from one of pads 210a, 210b, current no longer flows through user body portion 220 and circuit portion 305b is broken. Switching mechanism 325 reacts by breaking circuit portion 305a so as to disable power supply to power controller electronic control circuitry 320.

It will be apparent that although electrically conductive contacts are illustrated as elliptical pads 210a and 210b, any suitable contact shape and configuration may be used without departing from the scope of the invention. It will further be apparent that other locations of controller circuitry components and additional circuit components may be envisaged in the circuit of FIG. 3a without departing from the scope of the invention.

Figure 3B:
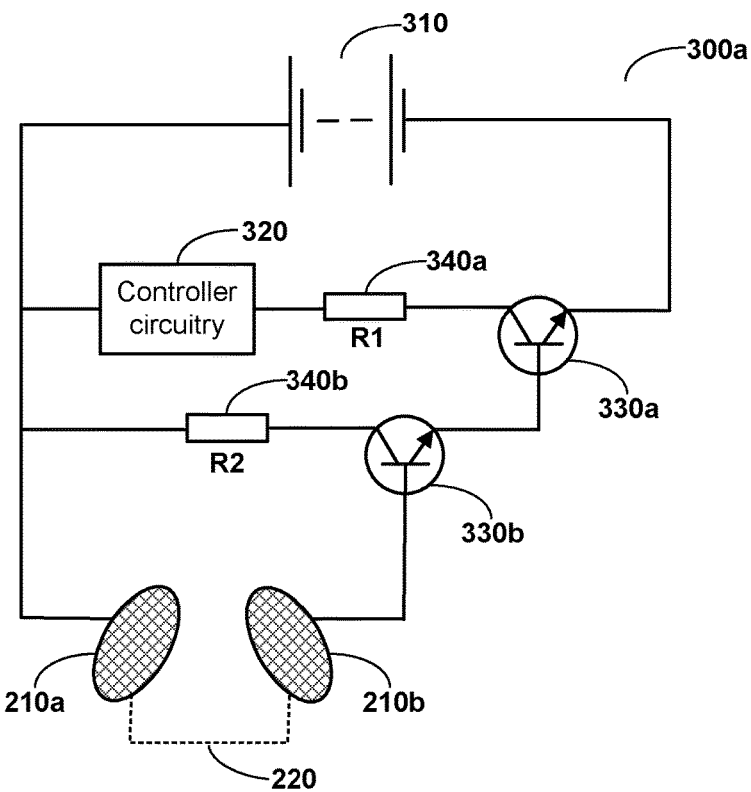
FIG. 3*b* illustrates a more detailed circuit diagram according to an embodiment of the present invention.

FIG. 3b illustrates an embodiment comprising one way of implementing the switching on and off of power to control circuitry 320 of controller 200. Circuit 300a comprises controller electronic control circuitry 320 and controller power pack comprising battery 310. Transistor 330a operates as a switch to allow current to flow through controller circuitry 320 when current flows into base of transistor 330a.

When the user grasps controller 200 with left and right hands contacting respectively electrically conductive contacts comprising pads 210a and 210b, a small electrical current flows via user body portion 220 and is input to base of transistor 330b. Transistor 330b comprises a Darlington pair with transistor 330a. Transistor 330b amplifies the current and emits this to base of transistor 330a, which further amplifies the current to a level sufficient to operate controller electronic control circuitry 320. The current gain provided by the combination is thereby increased. Circuit 300a may further comprise resistors 340a and 340b in which resistance R2 of resistor 340b is substantially greater than resistance R1 of resistor 340a.

When the user removes one or both hands from contact with pads 210a, 210b, current no longer flows through user body portion 220. No current now enters base of transistor 330b, so that transistor 330b is turned off and in turn emits no current to base of transistor 330a. Transistor 330a is thereby also turned off so that no current flows through controller electronic control circuitry 320 and controller 200 enters a powered off state.

It will be apparent to the skilled person that the circuit of FIG. 3b is only one of many possible arrangements which achieve the desired result. The skilled person will envisage many other circuit arrangements to provide a comparable effect. For example, in some embodiments, circuitry may include field-effect transistor elements. Some embodiments may comprise a detecting sensor mechanism which specifically detects presence or absence of electrical current flowing through the user's body. Embodiments may comprise an active switching mechanism which, responsive to the current detection or lack thereof, enables or disables the controller electronic control circuitry and/or the power supply therefor.

Figure 4:
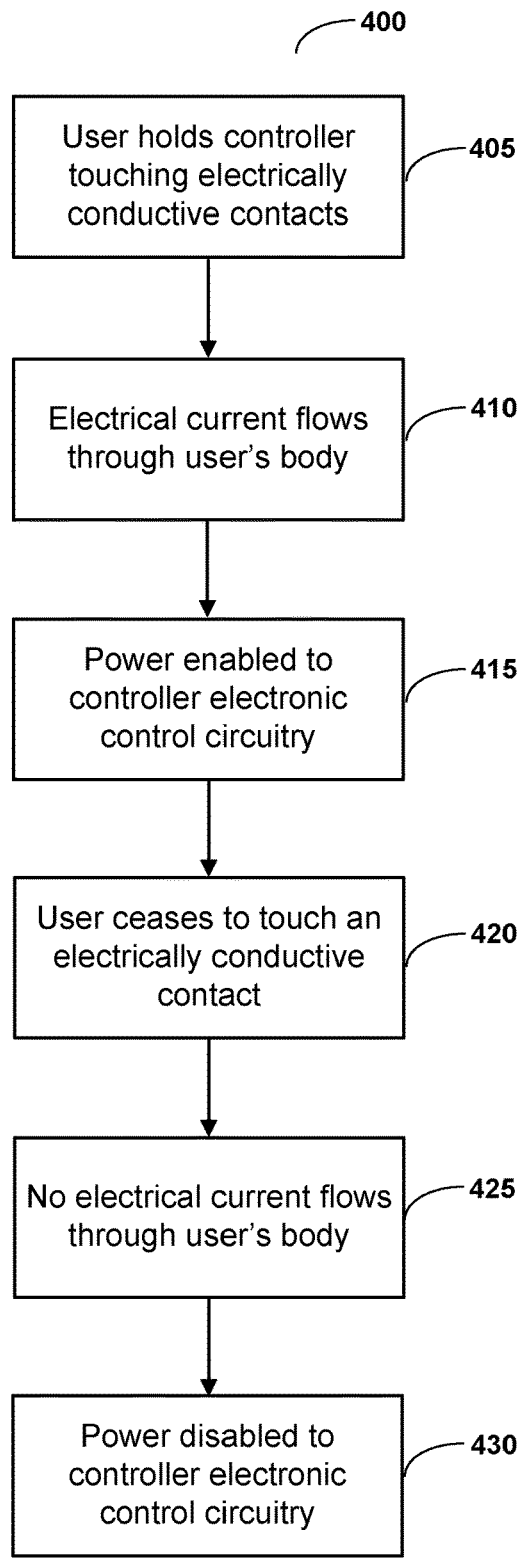
FIG. 4 is a flow chart illustrating the operation of an embodiment of the present invention.

FIG. 4 is a flow chart 400 which illustrates an embodiment of the present invention. At step 405, a user holds a controller comprising embodiments of the present invention so as to touch two separate electrically conductive contacts or pads, one with each hand. The controller circuitry applies a voltage between the contacts. At step 410 an electrical current flows through the user body between the contacts. At step 415 this current enables power supply to controller electronic control circuitry. The controller is now in a powered-on state.

At step 420 the user ceases to touch an electrically conductive contact or pad. At step 425, no electrical current flows through the user body as a result. At step 430, this lack of electrical current flowing through the user body disables power supply to controller electronic control circuitry. The controller is now in a powered-off state.

Figure 5A:
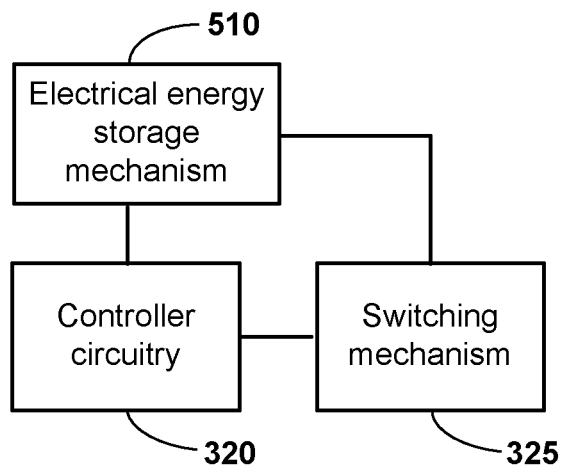
FIG. 5*a* illustrates part of a circuit diagram illustrating another embodiment of the invention.

Another embodiment is illustrated in FIG. 5a. The embodiment allows momentary loss of user contact with one or both electrically conductive contacts, and so breaking of the circuit through the user's body, without disabling electrical power to circuit portion 305a and controller electronic control circuitry 320. In FIG. 5a are shown controller circuitry 320 and switching mechanism 325 of FIG. 3a. Electrical energy storage mechanism 510 comprises a device to store a small amount of electrical energy. This may comprise a capacitor which is kept charged during normal use of the controller.

Electrical energy storage mechanism 510 receives notification from switching mechanism 325 of cessation of electrical current flowing through the user's body as described with reference to FIGS. 3a, 3b and 4. In response, stored electrical energy is delivered to controller circuitry 320 for a short period of time. If current resumes flowing through the user's body during this time as the circuit through the user's body is recreated, normal operation of controller circuitry 320 is not interrupted. The short period of time may be a second or less, for example.

Figure 5B:
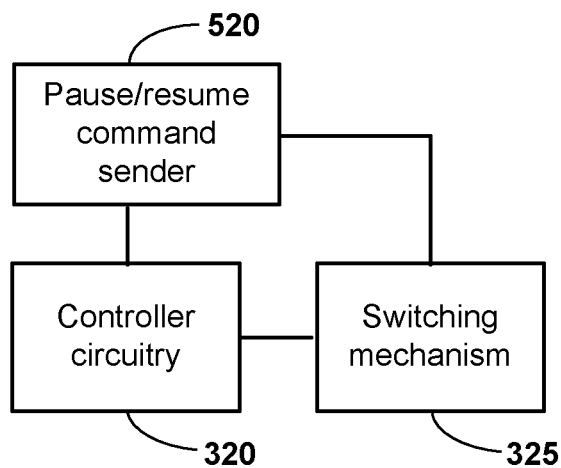
FIG. 5*b* illustrates part of a circuit diagram illustrating another embodiment of the invention.

A further embodiment of the invention is illustrated in FIG. 5b. The embodiment comprises further controller electronic circuitry which sends a "game pause" command to the video game playing device along with the disabling of electrical power to the controller electronic control circuitry at step 430 of FIG. 4. In another embodiment, controller electronic circuitry sends a "game resume" command to the video game playing machine along with the enabling of electrical power to controller electronic control circuitry at step 415 of FIG. 4.

In FIG. 5b are shown controller circuitry 320 and switching mechanism 325 of FIG. 3a. Pause/resume command sender 510 represents circuitry which receives a signal from switching mechanism 325 on cessation of current flowing through the user's body and breaking of this circuit as described with reference to FIGS. 3a, 3b and 4. Pause/resume command sender 520 emits a "game pause" command and communicates this to the wireless communication unit of the controller, which communicates the command wirelessly to the game playing device. This command may be the same as that produced by operation by a user of a "game pause" input control of the controller.

Similarly, when a user resumes use of the controller and current again flows through the user body as this circuit is recreated, pause/resume command sender 520 emits a "game resume" command and communicates this to the wireless communication unit of the controller, which communicates the command wirelessly to the game playing device. This command may be the same as that produced by operation by a user of a "game resume" input control of the controller.

If incorporated into the embodiment as described with reference to FIG. 3b, pause/resume command sender 520 may comprise a capacitor or similar charge storage device to store enough electrical energy to power the wireless communication unit for enough time to send a pause command before the controller enters the powered-off state.

In a further embodiment, the controller comprises both embodiments as illustrated in FIGS. 5a and 5b. In this case, pause/resume command sender 520 of the embodiment of FIG. 5b operates only after the electrical energy provided by electrical energy storage mechanism 510 is exhausted.

It will be apparent that embodiments of the invention may conveniently be incorporated into a controller manufacturing process to produce a controller 200 as illustrated in FIGS. 2a and 2b. Such a controller may be used with existing video game playing devices without necessitating any modifications to such devices.

A manufacturing process according to an embodiment of the invention comprises assembly of additional circuitry as described above with reference to FIGS. 3a and 3b and incorporation into the controller internal circuitry. It further comprises the production of electrically conductive contacts, for example comprising conductive pads 210a, 210b as illustrated in FIGS. 2a and 2b. A controller body of controller 200 may be formed, for example by a suitable plastics molding process, with provision on its surface for mounting of pads 210a, 210b, and to allow electrical connection of conductive pads 210a, 210b to controller circuitry as described with reference to FIGS. 3a and 3b. Conductive pads 210a, 210b are attached to the body of controller 200 and connected to controller circuitry. Alternatively conductive pads 210a, 210b may be formed in a plastics molding process integrally with the remainder of controller body of controller 200.

It will be apparent that the above described embodiments are not exhaustive. A person skilled in the art will understand that other arrangements may be envisaged without departing from the scope of the invention.

The invention claimed is:

1. A wireless controller for a video game playing device, comprising:
   input controls for operating by a user for entering video game playing commands;
   controller electronic control circuitry for communicating the entered video game playing commands to the video game playing device by wireless link; and
   controller electrical power supply for providing electrical power to the controller electronic control circuitry;
   electrically conductive contacts on portions of a surface of the wireless controller positioned so that a first contact is contactable by one hand of the user and a second contact is contactable by the other hand of the user during operation of the wireless controller;
   first electrical circuitry for applying a voltage between the first contact and the second contact so that when the one hand contacts the first contact and the other hand contacts the second contact an electrical current can flow through the user's body as an electrical circuit is completed;
   second electrical circuitry for, responsive to completion of the electrical circuit, enabling electrical power supply to the controller electronic control circuitry, and, responsive to breaking of the electrical circuit, disabling electrical power supply to the controller electronic control circuitry; and
   an electrical energy storage mechanism for supplying electrical power to the controller electronic control circuitry to prevent disabling of electrical power supply to the controller electronic control circuitry during a breaking of the electrical circuit; wherein a switching mechanism notifies the electrical energy storage mechanism of cessation of the electrical current flowing through the user's body such that when the user removes the one hand or the other hand from the first contact or the second contact, respectively, stored electrical energy from the electrical energy storage mechanism is supplied to the second electrical circuitry for a given amount of time so as to stay the completion of the electrical circuit.

2. The wireless controller of claim 1, wherein at least one of the electrically conductive contacts comprises a pad with an electrically conductive surface.

3. The wireless controller of claim 2, wherein the electrically conductive surface comprises an electrically conductive plastic.

4. The wireless controller of claim 1, further comprising:
   electronic control circuitry for, responsive to breaking of the electrical circuit and before disabling electrical power supply to the controller electronic control circuitry, wirelessly communicating a pause command to the video game playing device so as to pause a currently active video game.

5. The wireless controller of claim 1, further comprising:
   electronic control circuitry for, responsive to recreation of the electrical circuit after a period of breaking of the electrical circuit, wirelessly communicating a resume command to the video game playing device so as to resume a currently paused video game.

6. A method of operating a wireless controller for a video game playing device, the controller comprising:
   input controls for operating by a user for entering video game playing commands;
   controller electronic control circuitry for communicating the entered video game playing commands to the video game playing device by wireless link; and
   controller electrical power supply for providing electrical power to the controller electronic control circuitry;
   the method comprising:
   providing electrically conductive contacts on portions of a surface of the wireless controller positioned so that a first contact is contactable by one hand of the user and a second contact is contactable by the other hand of the user during operation of the wireless controller;
   applying a voltage between the first contact and the second contact so that when the one hand contacts the first contact and the other hand contacts the second contact an electrical current can flow through the user's body as an electrical circuit is completed;
   responsive to completion of the electrical circuit, enabling electrical power supply to the controller electronic control circuitry, and, responsive to breaking of the electrical circuit, disabling electrical power supply to the controller electronic control circuitry; and
   supplying electrical power to the controller electronic control circuitry from an electrical energy storage mechanism to prevent disabling of electrical power supply to the controller electronic control circuitry during a breaking of the electrical circuit; wherein a switching mechanism notifies the electrical energy storage mechanism of cessation of the electrical current flowing through the user's body such that when the user removes the one hand or the other hand from the first contact or the second contact, respectively, stored electrical energy from the electrical energy storage mechanism is supplied to the second electrical circuitry for a given amount of time so as to stay the completion of the electrical circuit.

7. The method of claim 6, wherein at least one of the electrically conductive contacts comprises a pad with an electrically conductive surface.

8. The method of claim 7, wherein the electrically conductive surface comprises an electrically conductive plastic.

9. The method of claim 6, further comprising:
   wirelessly communicating a pause command to the video game playing device so as to pause a currently active video game before disabling electrical power supply to the controller electronic control circuitry responsive to breaking of the electrical circuit.

10. The method of claim 6, further comprising:
   wirelessly communicating a resume command to the video game playing device so as to resume a currently paused video game responsive to recreation of the electrical circuit after a period of breaking of the electrical circuit.

* * * * *